United States Patent
Baltes et al.

(10) Patent No.: US 8,966,248 B2
(45) Date of Patent: Feb. 24, 2015

(54) SECURE SOFTWARE FILE TRANSFER SYSTEMS AND METHODS FOR VEHICLE CONTROL MODULES

(71) Applicant: GM Global Technology Operations LLC, Detroit, MI (US)

(72) Inventors: Kevin M. Baltes, Wixom, MI (US); Thomas M. Forest, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 176 days.

(21) Appl. No.: 13/627,055

(22) Filed: Sep. 26, 2012

(65) Prior Publication Data
US 2013/0268754 A1 Oct. 10, 2013

Related U.S. Application Data

(60) Provisional application No. 61/621,238, filed on Apr. 6, 2012.

(51) Int. Cl.
*H04L 9/00* (2006.01)

(52) U.S. Cl.
USPC .......................... 713/156; 713/155; 713/176

(58) Field of Classification Search
CPC ... H04L 29/06; H04L 9/3247; H04L 2209/60; H04L 2209/84
USPC ......................................... 713/156, 155, 176
See application file for complete search history.

(56) References Cited

U.S. PATENT DOCUMENTS

| | | | |
|---|---|---|---|
| 6,601,212 B1 | 7/2003 | Guha et al. | |
| 7,069,452 B1 | 6/2006 | Hind et al. | |
| 7,672,763 B1 | 3/2010 | Hunt et al. | |
| 7,778,752 B1 | 8/2010 | Hunt et al. | |
| 8,050,817 B2 | 11/2011 | Moinzadeh et al. | |
| 2004/0054779 A1* | 3/2004 | Takeshima et al. | 709/225 |
| 2004/0185842 A1 | 9/2004 | Spaur et al. | |
| 2005/0065678 A1 | 3/2005 | Smith et al. | |
| 2005/0187674 A1* | 8/2005 | Ando | 701/1 |

(Continued)

FOREIGN PATENT DOCUMENTS

| | | |
|---|---|---|
| WO | WO-2008/054058 A1 | 5/2008 |
| WO | WO-2009/117896 A1 | 10/2009 |
| WO | WO-2011/006378 A1 | 1/2011 |

OTHER PUBLICATIONS (Disclosed Anonymously), "Vehicle Charging and Information Sharing," IP.COM No. IPCOM000212734D, pp. 1-2, Nov. 26, 2011.

(Continued)

*Primary Examiner* — Baotran N To

(57) ABSTRACT

A server includes an import module that receives a first content file and a first instruction file from a design network. The first instruction file includes a first set of parameters. A job request module, based on the first instruction parameter set, determines a second parameter set and generates a second instruction file comprising the second parameter set. The job request module transmits the first content file and the second parameter set to a signature server. An export module receives a signature file from the signature server. The signature server generates the signature file based on the second instruction file. The export module integrates the signature into the first content file to generate a second content file and downloads the second content file to at least one of a service server, a manufacturing server, and a supplier network.

20 Claims, 4 Drawing Sheets

(56) References Cited

U.S. PATENT DOCUMENTS

| | | | |
|---|---|---|---|
| 2005/0256614 A1* | 11/2005 | Habermas | 701/1 |
| 2006/0143600 A1 | 6/2006 | Cottrell et al. | |
| 2008/0027602 A1 | 1/2008 | Yeap et al. | |
| 2009/0119657 A1 | 5/2009 | Link, II | |
| 2009/0259349 A1 | 10/2009 | Golenski | |
| 2009/0327741 A1 | 12/2009 | Zimmer et al. | |
| 2010/0130160 A1 | 5/2010 | Fayyad | |
| 2011/0166742 A1 | 7/2011 | Hunt et al. | |
| 2011/0201302 A1 | 8/2011 | Hatton | |
| 2011/0239211 A1 | 9/2011 | Kim et al. | |
| 2013/0111212 A1 | 5/2013 | Baltes et al. | |
| 2013/0159717 A1 | 6/2013 | Rabadi et al. | |

OTHER PUBLICATIONS

Nilsson, Dennis K. "Secure Firmware Updates over the Air in Intelligent Vehicles," Communictions Workshops, ICCC 2008, IEEE International, May 19-23, 2008, pp. 380-384.

Nilsson et al., "A Framework for Self-Verification of Firmware Updates over the Air in Vehicle ECUs," Jun. 26, 2009, IEEE, pp. 1-5.

U.S. Appl. No. 61/552,931, filed Oct. 28, 2011, Baltes et al.

U.S. Appl. No. 13/327,216, filed Dec. 15, 2011, Rabadi et al.

U.S. Appl. No. 13/557,031, filed Jul. 24, 2012, Baltes et al.

* cited by examiner

SECURE SOFTWARE FILE TRANSFER SYSTEMS AND METHODS FOR VEHICLE CONTROL MODULES

CROSS-REFERENCE TO RELATED APPLICATIONS

This application claims the benefit of U.S. Provisional Application No. 61/621,238, filed on Apr. 6, 2012. The disclosure of the above application is incorporated herein by reference in its entirety.

FIELD

The present disclosure relates to secure file transfer systems for transfer of vehicle files.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles include various vehicle control modules, such as an engine control module, a transmission control module, a climate control module, an infotainment control module, a body control module, etc. The vehicle control modules execute software and/or firmware files in order to perform respective functions.

The automobile industry is continually adding features with increased conveniences to vehicles and thus vehicle control modules. Mobile devices are connected to vehicle systems to transfer various types of audio and video data, as well as vehicle diagnostic and status data. Features within the vehicle may be controlled remotely via the mobile devices. As a result, there is an increased threat for the download of malicious software into the vehicle control modules. As vehicles become more digitally connected to external computing devices, exposure to an attack is increased. Examples of types of attacks may include attacks that infiltrate vehicle electronic and/or software systems, reprogram vehicle control modules, include unauthorized exfiltration of vehicle data, and/or involve unauthorized vehicle tracking.

Authentication of a file may be performed to validate a source and/or content of the file prior to execution. Authentication is performed to prevent download and/or execution of a malicious file and/or to prevent malicious and/or unauthorized alteration of a file. Consequences of executing an invalidated file can include unintended vehicle system behavior, decreased life of vehicle components, loss of vehicle anti-theft features, potential tampering with vehicle components, alteration of vehicle files, and/or loss of vehicle features and/or functions. Execution of an invalidated file can also result in a vehicle warranty being voided.

One secure technique for preventing execution of invalidated files is referred to as asymmetric key cryptography. Asymmetric key cryptography includes using digital signatures to authenticate files, which are to be programmed into a control module. A pair of keys including a private key and a public key is used to encrypt and decrypt a digital signature. The private key is available only to a source of the file to be transferred. The source of a file may encrypt the digital signature using the private key. The encrypted digital signature may be transferred from the source to a control module. The control module may then decrypt the encrypted digital signature using the public key. The control module may verify the signature and based on this verification, for example, download, store, and/or execute the file.

SUMMARY

A server is provided and includes an import module that receives a first content file and a first instruction file from a design network. The first instruction file includes a first set of parameters. A job request module, based on the first instruction parameter set, determines a second parameter set and generates a second instruction file comprising the second parameter set. The job request module transmits the first content file and the second parameter set to a signature server. An export module receives a signature file from the signature server. The signature server generates the signature file based on the second instruction file. The export module integrates the signature into the first content file to generate a second content file and downloads the second content file to at least one of a service server, a manufacturing server, and a supplier network.

In other features, a method is provided and includes receiving a first content file and a first instruction file from a design network. The first instruction file includes a first set of parameters. Based on the first instruction parameter set, a second parameter set is determined and a second instruction file is generated including the second parameter set. The first content file and the second parameter set are transmitted to a signature server. A signature file is received from the signature server. The signature server generates the signature file based on the second instruction file. The signature is integrated into the first content file to generate a second content file. The second content file is downloaded to at least one of a service server, a manufacturing server, and a supplier network.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

A server may generate a signature to secure a content file being transferred between network devices of an OEM network, between a network device of the OEM network and a network device external to the OEM network, and/or between network devices external to the OEM network. The signature may be a digital signature used to assure message or file integrity and/or source identity. A network device may refer to, for example, servers, computers, control modules external to or internal to a vehicle, stations, terminals, etc. An OEM network may be a network of, for example, a vehicle manufacturer. Techniques are disclosed herein to address: how signatures are generated, embedded and used; how users exchange and/or download information, content, files, and/or programs with devices in and external to an OEM network; and how devices within the OEM network exchange and/or download information, content, files, and/or programs.

Figure 1:
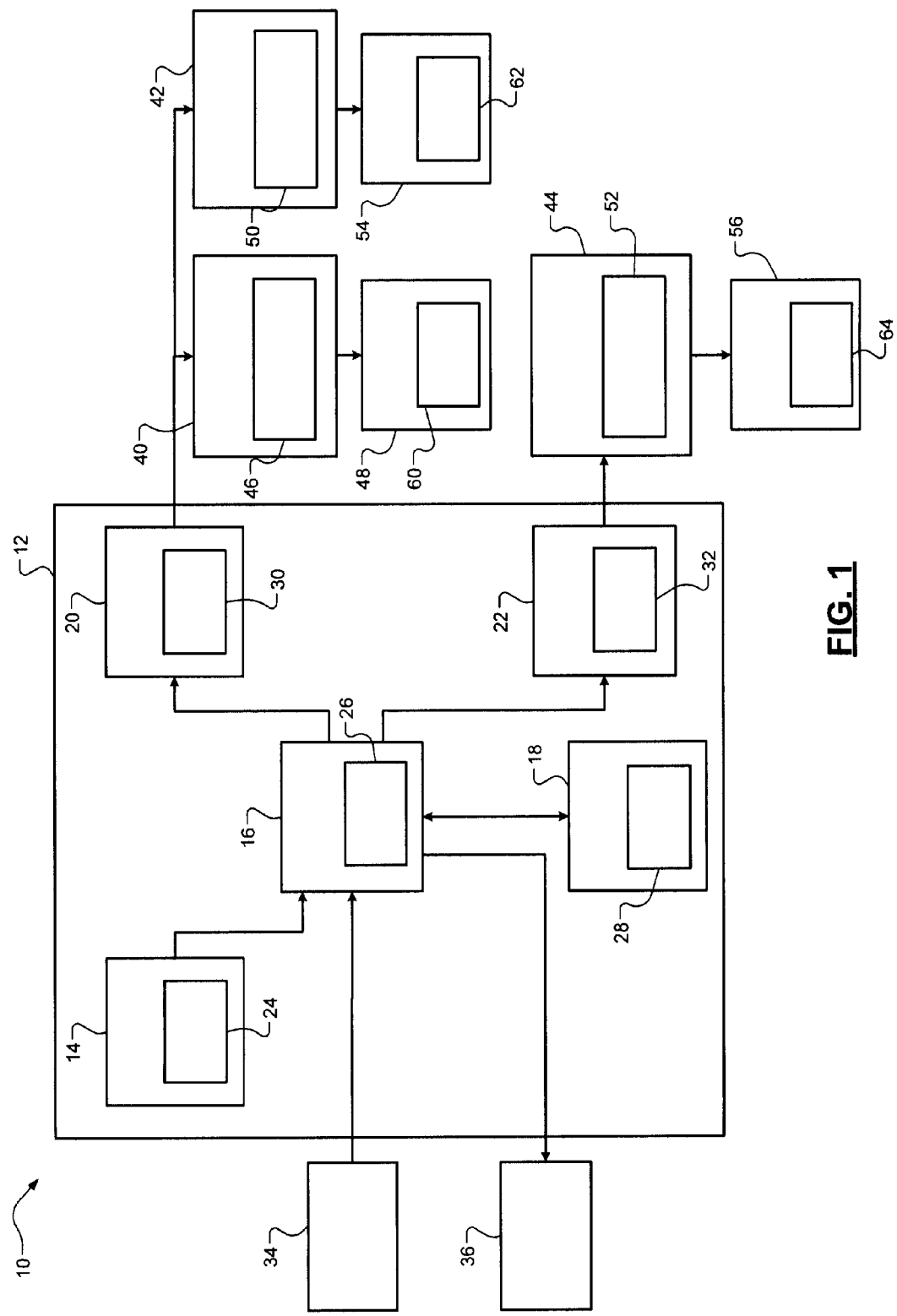
FIG. 1 is a functional block diagram of a file download system incorporating a original equipment manufacturer (OEM) download network in accordance with the present disclosure.

In FIG. 1, a file download system 10 is shown and provides a file exchange topology for the transfer, generation and/or integration of information, content files, and/or signatures. The file download system 10 includes an OEM download network 12. The OEM download network 12 includes an OEM design (or engineering) network 14, a soft part (or content file) server 16, a signature server 18, a service server 20, and a manufacturing server 22. The OEM design network 14 includes network devices 24 and each of the servers 16-22 includes respective content, signature, service, and manufacturing memories 26-32.

The OEM design network 14 may include a network device at which data is entered by a user. The user may create a soft part (or content file) at the network device and download that soft part to the soft part server 16. The soft part may include, for example, a software and/or firmware program, calibration information, a boot program, key replacement information, a manifest (i.e. a record, table, or list), a license file, etc. The soft part server 16 stores soft parts in the content memory 26 and instructs the signature server 18 how to generate a signature. The signature server 18 generates the signature based on instructions from the soft part server 16. The soft part server 16 may then download a signed content file to at least one of the service server 20 and the manufacturing server 22.

The file download system 10 may further include a supplier design network 34 and a supplier manufacturing network 36. The supplier design network 34 may generate a soft part similar to the OEM design network 14 and download the soft part to the soft part server 16. The supplier manufacturing network 36 may receive a signed content file from the soft part server 16. The soft part may have been originally created by the OEM design network 14 and/or the supplier design network 34.

The file downloading system 10 may further include an OEM service network 40, a third party service network 42, and an OEM manufacturing network 44. The OEM service network 40 may include, for example, service centers and/or vehicle dealers, each of which having respective service control modules (referred to as tools). A single service control module (Tool1) 46 is shown. The service control modules may be, for example, computers used to program and/or download information to a vehicle control module 48. The OEM service network 40 may download signed content files to vehicle control modules within a vehicle via the tools. The tools may pull signed content files from the service server 20.

As an example, a tool may query a vehicle for soft part numbers on one or more vehicle control modules of the vehicle. The tool may then determine which soft parts should be on the respective vehicle control modules and then reprogram, update and/or download the appropriate signed content files to the vehicle control modules selected.

The third party service network 42 may include, for example, one or more service centers, each of which having respective service control modules. A single service control module (Tool2) 50 is shown. The service control module 50 includes a vehicle control module 54. The third party service network 42 may download signed content files to vehicle control modules within a vehicle via the tools. The tools may pull signed content files from the service server 20 and download the files to the vehicle control modules.

The OEM service manufacturing network 44 may include one or more manufacturing facilities at which, for example, a system of a vehicle and/or the vehicle is manufactured. Each of the facilities may also include tools for downloading signed content files. An example manufacturing control module (Tool3) 52 is shown. The manufacturing control module 52 includes a vehicle control module 56. The facilities may download signed content files from the manufacturing server 22. The signed content files may be downloaded based on, for example, build orders. The tools may then download the signed content files to vehicle control modules within systems and/or vehicles. The vehicle control modules 48, 50, 52 may include respective security control modules 60, 62, 64, which authorize and verify signatures, content and/or sources of content files received from the service server 20 and the manufacturing server 22.

Subsequent to receiving the signed content files, the vehicle control modules 60-64 may perform authorization and verification procedures to verify signatures, content and/or sources of the signed content files. Various authorization and verification procedures may be used. As an example, the vehicle control modules may separate the signatures from the content files, decrypt the signatures using public keys to generate first hash values, generate second hash values based on the soft parts of the signed content files, and compare the first hash values with the second hash values. If a first hash value matches a second hash value, the corresponding signed content file may be considered valid, otherwise the signed content file may be considered invalid. The public keys may correspond to private keys used by a design network to encrypt data in the soft parts when originally created.

Figure 2:
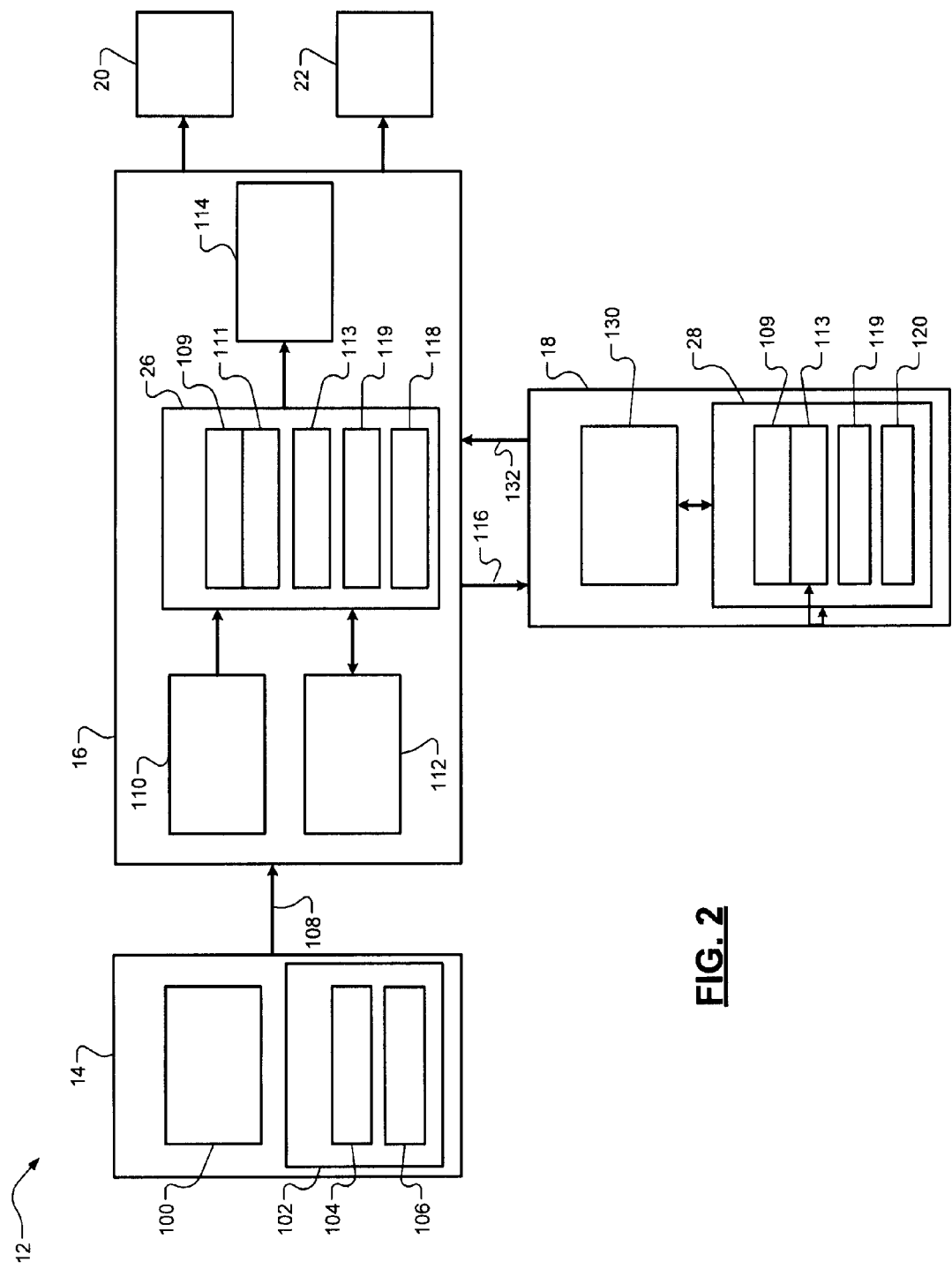
FIG. 2 is a functional block diagram of the OEM download network of FIG. 1.

Referring now also to FIG. 2, the OEM download network 12 is shown. The OEM download network 12 includes the design network 14, the soft part server 16, and the signature server 18. The design network 14 includes a design control module 100 and design memory 102. The design memory 102 may store soft parts 104 and corresponding first sets of parameters 106. The design control module 100 may create the soft parts 104 and the first sets of parameters 106. Example parameters that may be provided in each of the first sets of parameters 106 are listed in Table 1.

TABLE 1

Example Parameters in First Instruction Files.

| Parameter | Description |
|---|---|
| Address of the content memory 26 where a signature within a soft part is stored. | Is the address of the signature embedded into the soft part by the soft part server 16. |

TABLE 1-continued

Example Parameters in First Instruction Files.

| Parameter | Description |
| --- | --- |
| Address of the content memory 26 where a description of a signature algorithm for a soft part is stored. | Is the address of the signature algorithm used by the soft part server 16 to embed the signature into the soft part. The address refers to where the signature algorithm is stored as part of the soft part. |
| Address of the content memory 26 where the description of the signature algorithm is also stored. | Is the address of the signature algorithm used by the soft part server 16 to embed the signature into the soft part. The address refers to where the signature algorithm is stored as part of a bootloader file (or boot part). The bootloader file is executed by a vehicle control module to validate the signature of a content file. |
| Address of the content memory 26 where a key identifier (ID) used to sign a soft part is stored. | Is the address used by the soft part server 16 to embed the key ID into the soft part. |
| Address of the content memory 26 where the key ID is also stored with a bootloader file. | Is the address used by the soft part server 16 to embed the key ID into the bootloader file. The key ID is used when executing the bootloader file to check compatibility of a vehicle control module with a soft part. |
| Address of the content memory 26 where a key is stored with the bootloader file. | Is the address used by the soft part server 16 to embed the key into the bootloader file. |
| Address of the content memory 26 where a signature bypass flag is stored. | Is the address used by the soft part server 16 to embed the signature bypass flag into a bootloader file. |
| Number of bytes. | Length of a soft part downloaded from a design network to the soft part server 16. |
| Security Level | Security level of the soft part. The security level may be used when executing a bootloader file to prevent soft parts with invalid security levels from being programmed into a vehicle control module. The security level may be, for example, a software content file. |
| Control Module ID | Information to uniquely identify a vehicle control module. This allows a programming package provided as a one or more soft parts to be targeted to an individual vehicle control module. |
| Integrity Check Description and Value | Identify an integrity scheme used to check validity of a soft part downloaded from a design network to the soft part server 16. Can be used to prevent processing of the soft part if integrity check fails. |
| Part Number | Part number of the soft part. |
| Part Type | Indicates, for example, if the soft part is a software file, a firmware file, a calibration file, a bootloader file, a key replacement file, a manifest, a license file, etc. |
| Part Usage Value | Indicates, for example, whether a target vehicle control module for a soft part allows the soft part server 16 to select an appropriate key for signing the soft part. |
| Creator ID | Identifies a creator (person and/or network device) of the soft part. |
| Certificate | May indicate whether a signing certificate is to be delivered to a target vehicle control module as part of a reprogramming package. The certificate may be used to verify websites and may provide information with regards to permitted use of a soft part. The certificate may indicate a key to use to validate a signature, what products (e.g., vehicles) the soft part is to be used on, and/or what vehicle control modules the soft part is to be used on. |

The first sets of parameters 106 may include parameters not included in Table 1, for example a signature version. The signature version may identify a cryptography version. Different cryptography versions may be used based on a security level. Cryptography versions with larger resulting encrypted files may be used for higher security levels, where cryptography versions with shorter encrypted files may be used with lower security levels. The first sets of parameters 106 may also include signature integration parameters that indicate where a signature is to be embedded in a soft part.

One of the first sets of parameters 106 may be provided in a first instruction file XML1 and accompany a soft part (or first content file) PART, collectively signal 108. The soft part PART and the first instruction file XML1 may be downloaded from the design network 14 to the soft part server 16. The soft part PART and the first instruction file XML1 may alternatively be received from, for example, the supplier design network 34 of FIG. 1.

The soft part server 16 includes the content memory 26, an import module 110, a job request module 112, and an export module 114. The import module 110 receives soft part and instruction file pairs (e.g., signal 108) from one or more design network(s) and corresponding network devices. The import module 110 may store the soft parts 109 and instruction files 111 in the content memory 26. The instruction files 111 may be, for example, extensible markup language (XML) files and/or other markup, programming, and/or content language files.

The job request module 112 generates job requests based on the soft parts 109 and instructions files 111 received from the design networks. A job request may include one of the received soft parts PART and a second instruction file XML2, collectively signal 116. Each of the second instruction files 113 provides information in the form of a second set of parameters to be used by the signature server 18 when generating a signature for a soft part. Second sets of parameters 118 are stored in the content memory 26. Example parameters that may be included in each of the second sets of parameters 118 are listed in Table 2.

TABLE 2

Example Parameters in Second Instruction Files.

| Parameter | Description |
| --- | --- |
| Job ID | Is a unique job or transaction identifier assigned by the soft part server 16 to identify a job (or signature) request such that the appropriate soft part and signature are combined by the soft part server 16. This occurs subsequent to information including the signature being transmitted from the signature server 18 to the soft part server 16. |
| Key ID | Is an identification of a key used by the signature server 18 to generate a signature, which is used to sign a soft part. |
| Signature Algorithm ID | Identifies a selected one of multiple signature algorithms to be used when generating the signature. |

The second sets of parameters 118 may include parameters not included in Table 2, for example, the second sets of parameters 118 may include the signature version. The second sets of parameters 118 may include signature integration parameters that indicate where a signature is to be embedded in a soft part.

The job request module 112 may store the second instruction files 113 in the content memory 26. The second instruction files 113 may be, for example, XML files and/or other markup, programming, and/or content language files. The job request module 112 transmits the soft parts 109 and corresponding second instruction files 113 to the signature server 18 for generation of signatures.

The export module 114 receives the signatures in third instruction files 119 from the signature server 18. The third instruction files 119 may include a third set of parameters, which may include, for example, the signatures, the job ID (described in Table 2), or other parameters. Third sets of parameters 120 are stored in the content memory 26. The export module 114 may embed the signatures in the appropriate ones of the soft parts 109 to generate second content files. The second content files may be transmitted to the service server 20, the manufacturing server 22, or the supplier manufacturing network 36 in FIG. 1.

The signature server 18 may include the signature memory 28 and a signature control module 130. The signature control module 130 may receive the soft parts 109 and the accompanying second instruction files and based thereon generates the third instruction files 119. The third instruction files 119 may be sent to the soft part server 16 as signals XML3 132. The soft parts 109, the second instruction files 113, the third instruction files 119, and the third sets of parameters 120 may be stored in the signature memory 28.

The export module 114 may also embed a key and/or a key ID for decrypting a content file and/or certain contents of the content file in a bootloader file. The key and/or key ID may be provided as parameters of the first sets of parameters, the second sets of parameters, and/or the third sets of parameters. The bootloader file may be downloaded from the export module 114 to a vehicle control module via, for example, the servers 20, 22 and the networks 40, 42, 44. The bootloader file may include instructions that when executed by the vehicle control module verify a signature, a soft part, and/or a source of the signature and/or soft part based on the key and/or key ID. The bootloader file may also include instructions to boot up the vehicle control module.

Figure 3:
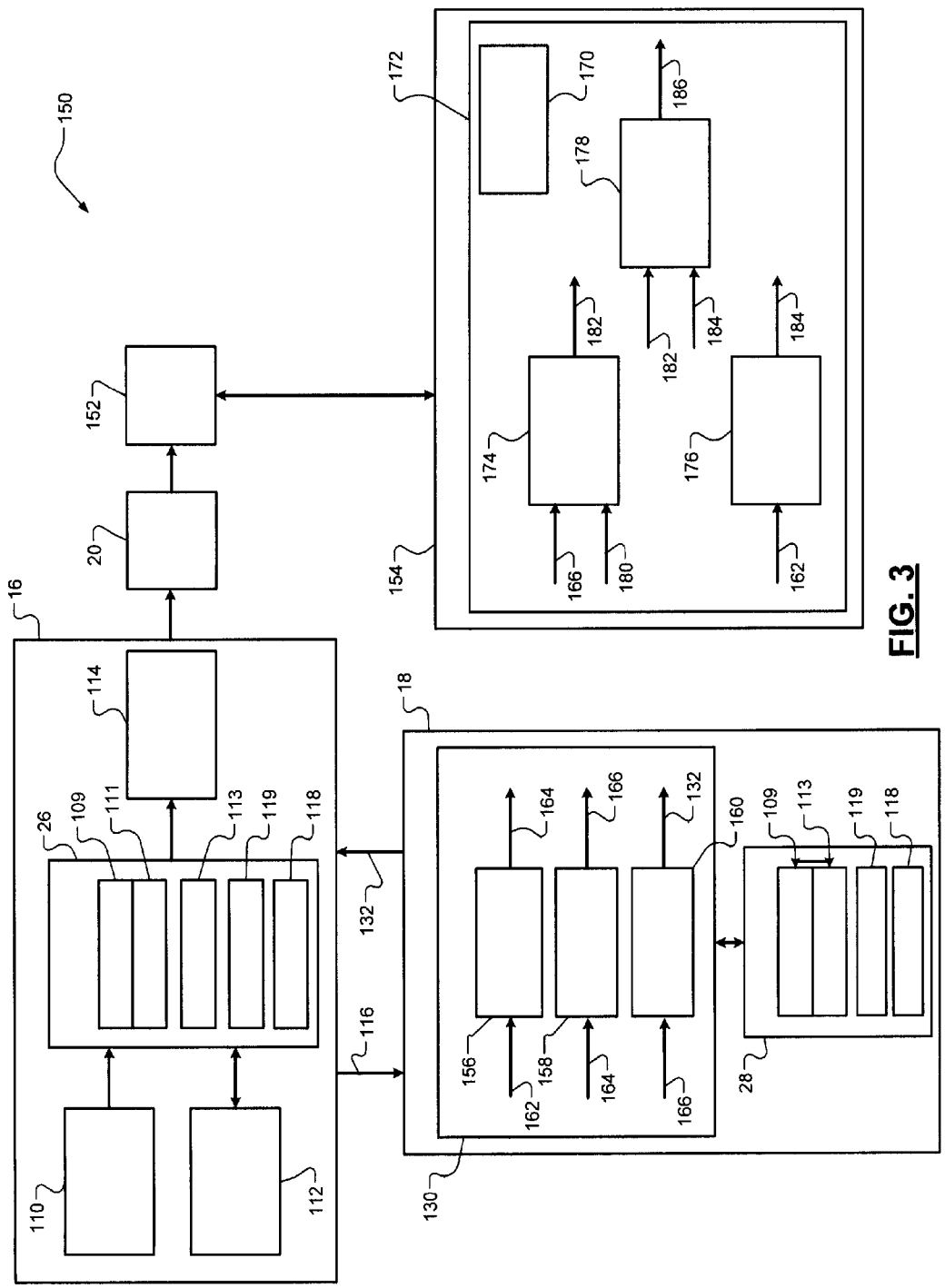
FIG. 3 is a functional block diagram of a portion of the file download system illustrating an example content file download procedure in accordance with the present disclosure.

In FIG. 3, a portion 150 of the file download system 10 illustrating an example content file download procedure is shown. The portion 150 includes the soft part server 16, the signature server 18, the service server 20, a service control module 152 (e.g., one of the control modules 46, 50), and a vehicle control module 154. The soft part server 16 includes the content memory 26, the import module 110, the job request module 112, and the export module 114. The job request module 112 transmits each soft part and second instruction signal (e.g., 116) to the signature server 18. The content memory 26 stores the soft parts 109, the instruction files 111, 113, 119 and the second sets of parameters 118.

The signature server 18 includes the signature control module 130 and the signature memory 28. The signature memory 28 stores the soft parts 109, the instruction files 113, 119, and the third sets of parameters 118. The signature control module 130 may include a first cryptographic module 156, an encryption module 158, and an instruction module 160. The cryptographic module 156 may receive a soft part PART 162 and generate a first hash value HASH1 164. The encryption module 158 may encrypt the first hash value HASH1 164 using a private key to generate a signature SIG 166. The instruction module 160 may generate the third instruction signal XML3 132 based on the signature 166. Operation of the first cryptographic module 156, the encryption module 158, the instruction module 160 and/or the generation of the first hash value HASH1 164, the signature SIG 166, and/or the third instruction signal XML3 132 may be based on one or more of the parameters in the second instruction file of the signal 116.

The export module 114 receives the third instruction signal 132 from the signature server 18 and embeds the signature SIG 166 of the third instruction signal 132 in the corresponding soft part to generate a second content file. The export module downloads the second content file to the service server 20. The service server 20 may then download the second content file upon request to the service control module 152. The service control module 152 may then flash program, reprogram, update, and/or store the second content file in memory 170 of the vehicle control module 154.

The vehicle control module 154 may include a security module 172. The security module 172 may include a decryption module 174, a second cryptographic module 176, and a hash comparison module 178. The decryption module 174 decrypts the signature SIG 166 using a public key PUB 180 corresponding to the private key to generate a second hash value HASH2 182. The second cryptographic module 176 generates a third hash value HASH3 184 based on the soft part PART 162. The hash comparison module 178 compares the second hash value HASH2 with the third hash value HASH3 184. If the second hash value HASH2 182 matches the third hash value HASH3 184 then the signature is valid, otherwise the signature is invalid. This may be indicated via a validation signal VAL 186.

Figure 4:
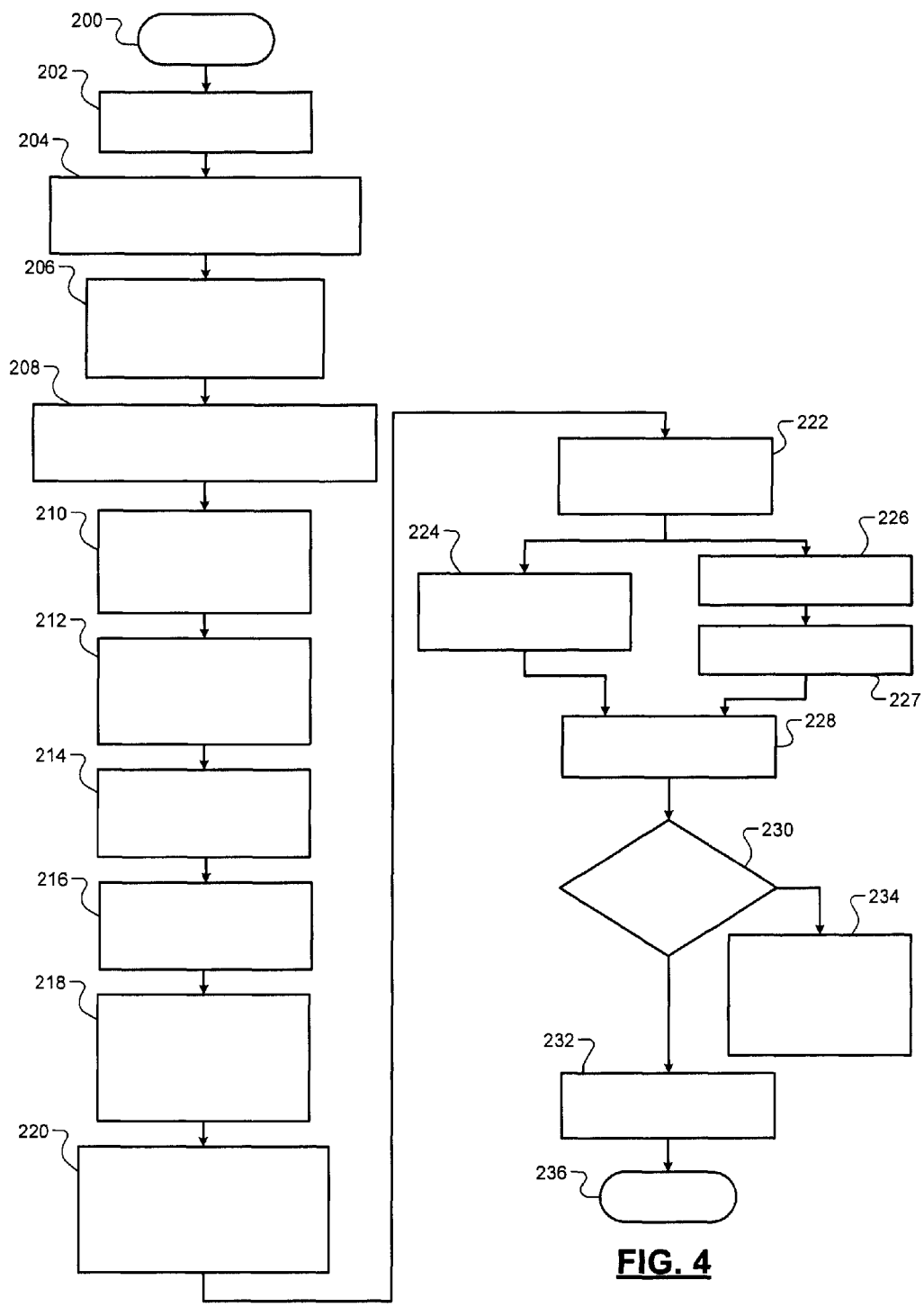
FIG. 4 illustrates a method of operating a file download system in accordance with the present disclosure.

The file download system 10 may be operated using numerous methods, an example method is provided by the method of FIG. 4. In FIG. 4, a method of operating a file download system is shown. Although the following tasks are primarily described with respect to the implementations of FIGS. 1-3, the tasks may be easily modified to apply to other implementations of the present disclosure. The tasks may be iteratively performed. The method may begin at 200.

At 202, a soft part (or first content file) is generated via a design control module of a design network (e.g., the OEM design network 14 or the supplier design network 54). At 204, the design control module may determine a first set of parameters (example parameters are listed in Table 1 above) and generate the first instruction file XML1. The first instruction file XML1 is used by the soft part server 16 to properly sign and store the soft part, as further described with respect to the following tasks. For example only, the first content file may be encrypted using a private key, as described above.

At 206, the import module 110 receives the soft part and the first instruction file from the design network. At 208, the job request module 112 determines a second set of parameters (example parameters are listed in Table 2 above) and generates the second instruction file XML2 based on the first instruction file. The second set of parameters may be a sub-set of the first set of parameters and/or may include different parameters than the first set of parameters.

At 210, the job request module 112 transmits a job (or signature) request including the soft part and the second instruction file XML2 to the signature server 18. The second instruction file XML2 accompanies the soft part to the signature server 18 and may inform the signature server 18 how a signature should be generated. At 212, the signature control module 130 determines a third set of parameters and generates a signature file based on the second set of parameters in the second instruction file. The signature file may be an XML file and/or other markup, programming, and/or content language file. The third set of parameters may be a sub-set of the second set of parameters and/or include different parameters than the second set of parameters. Examples parameters that may be included in the third set of parameters are described above with respect to FIG. 2. The signature module 18 transmits the signature file including the third set of parameters to the soft part server 16.

At 214, the export module 114 receives the signature file. At 216, the export module 114 integrates a signature in the signature file into the soft part to generate a signed (or second) content file. At 218, the export module 114 downloads the second content file to at least one of the supplier, service, and manufacturing networks 36, 40, 42 and/or to control modules and/or networks devices in the supplier, service, and manufacturing networks 36, 40, 42.

At 220, one or more of the control modules of the supplier, service, and manufacturing networks 36, 40, 42 may download the second content file to a vehicle control module within a vehicle.

The following tasks 222-234 are provided as an example and may not be performed. Alternative authorization and verification tasks may be performed instead of tasks 222-234.

At 222, one of the vehicle control modules may separate the signature in the second content file from the second content file. At 224, the signature may be decrypted with a public key to generate a first hash value. At 226, the soft part of the second content file may be stored in or flashed to a memory of the vehicle. At 227, the vehicle control module may calculate a second hash value based on the soft part.

At 228, the vehicle control module may compare the first hash value to the second hash value to determine whether the signature, the soft part and/or source(s) of the soft part and/or signature are valid. At 230, if the first hash value matches the second hash value then the signature, the soft part and/or the source(s) are determined valid at 232. If the first hash value does not match the second hash value then the signature, the soft part and/or the source(s) are determined to be invalid at 234. At 232, the vehicle control module may execute the soft part and/or used information in the soft part to perform tasks within the vehicle. At 234, the vehicle control module may refrain from executing the soft part, not use information in the soft part, and/or erase the soft part. The method may end at 236.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The above-described implementations include the transfer of instruction files and signature files, which may be XML files. The XML files facilitate generation of signatures. Use of XML files allows servers, tools, and/or other network devices to read information in a predictable, automated manner, while eliminating manual entry of parameters. The transfer of files as described also supports secure flash programming of vehicle control modules to prevent malicious content files from being programmed into vehicle control modules.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. A first server comprising:
    an import module that receives a first content file and a first instruction file from a design network, wherein the first instruction file includes a first set of parameters;
    a job request module that, based on the first set of parameters, determines a second set of parameters and generates a second instruction file comprising the second set of parameters, wherein the job request module transmits the first content file and the second instruction file to a signature server; and
    an export module that receives a signature file from the signature server, wherein the signature file includes a signature, and wherein the signature server generates the signature file based on the second instruction file, and
    wherein the export module integrates the signature into the first content file to generate a second content file and downloads the second content file to at least one of a service server, a manufacturing server, and a supplier network,
    wherein
        the first set of parameters comprises (i) a part number of the first content file, (ii) a part usage value, and (iii) a part type of the first content file, and
        the job request module (i) based on the part usage value, determines whether a first vehicle control module permits the server to select a signing key, (ii) based on the part type, determines a type of the first content file, and (iii) generates the second instruction file based on the part number, the part usage value, and the part type.

2. The first server of claim 1, wherein:
    the first set of parameters includes a key identifier;
    the second set of parameters include the key identifier; and
    the export module generates the signature based on the key identifier.

3. The first server of claim 1, wherein each first instruction file, the second instruction file, and the second content file are extensible markup language files.

4. The first server of claim 1, wherein: the first set of parameters comprises a first address of the signature and a second address of a signature algorithm, and the export module stores the signature when generating the second content file based on the first address and the second address.

5. The first server of claim 1, wherein:
    the first set of parameters comprises an address of a second key; and
    the export module embeds the second key in a boot file based on the address and exports the boot file for use by the first vehicle control module,
    wherein the boot file includes instructions that when executed by the first vehicle control module verify the signature based on the second key.

6. The first server of claim 1, wherein the job request module, based on the part type, determines whether the first content file is one of a calibration file, a software file, a firmware file, a boot file, a key replacement file, and a license file.

7. The first server of claim 1, wherein:
    the first set of parameters comprises
        a creator identifier indicating a person that created the first content file, and
        a certificate indicating a second key to use to validate the signature and a plurality of vehicle control modules to use the second content file, wherein the plurality of vehicle control modules include the first vehicle control module;
    the job request module generates the second instruction file based on the creator identifier and the certificate; and
    the export module generates the second content file based on the certificate.

8. The first server of claim 1, wherein the second set of parameters comprises:
    a job identifier indicating a number of a job request including the first content file and the second set of parameters;
    a key identifier indicating a second key the signature server is to use to generate the signature; and
    a signature algorithm identifier indicating a signature algorithm the signature server is to use to generate the signature.

9. The first server of claim 1, wherein:
    the signature file comprises a third set of parameters; and
    the third set of parameters comprises:
    a job identifier indicating a number of a job request including the first content file and the second set of parameters; and
    the signature.

10. A file download system comprising:
    a first server, wherein the first server comprises
    an import module that receives a first content file and a first instruction file from a design network, wherein the first instruction file includes a first set of parameters,
    a job request module that, based on the first set of parameters, determines a second set of parameters and generates a second instruction file comprising the second set of parameters, wherein the job request module transmits the first content file and the second instruction file to a signature server,
    a memory configured to store the second set of parameters, and an export module that receives a signature file from the signature server, wherein the signature file includes a signature, and wherein the signature server generates the signature file based on the second instruction file, wherein the export module integrates the signature into the first content file to generate a second content file and downloads the second content file to at least one of a service server, a manufacturing server, and a supplier network, and wherein the first set of parameters comprises (i) a part number of the first content file, (ii) a part usage value, and (iii) a part type of the first content file, and the job request module (i) based on the part usage value, determines whether a first vehicle control module permits the server to select a signing key, (ii) based on the part type, determines a type of the first content file, and (iii) generates the second instruction file based on the part number, the part usage value, and the part type;

the service server; and the manufacturing server.

11. The file download system of claim 10, further comprising the design network.

12. The file download system of claim 10, wherein at least one of:

the service server downloads the second content file to a service control module, wherein the service control module downloads the second content file to the first vehicle control module in a vehicle; and the manufacturing server downloads the second content file to a manufacturing control module, wherein the manufacturing control module downloads the second content file to the first vehicle control module.

13. A method comprising:

receiving a first content file and a first instruction file from a design network, wherein the first instruction file includes a first set of parameters, wherein the first set of parameters comprises (i) a part number of the first content file, (ii) a part usage value, and (iii) a part type of the first content file;

based on the first set of parameters, determining a second set of parameters and generates a second instruction file comprising the second set of parameters;

transmitting the first content file and the second instruction file to a signature server;

receiving a signature file from the signature server, wherein the signature file includes a signature, and wherein the signature server generates the signature based on the second instruction file;

integrating the signature into the first content file to generate a second content file;

downloading the second content file to at least one of a service server, a manufacturing server, and a supplier network;

based on the part usage value, determining whether a first vehicle control module permits the server to select a signing key;

based on the part type, determining a type of the first content file; and generating the second instruction file based on the part number, the part usage value, and the part type.

14. The method of claim 13, further comprising generating the signature based on an identifier of a second key, wherein:

the first set of parameters includes the identifier of the second key; and the second set of parameters includes the identifier of the second key.

15. The method of claim 13, wherein each first instruction file, the second instruction file, and the second content file are extensible markup language files.

16. The method of claim 13, further comprising storing the signature when generating the second content file based on a first address and a second address, wherein the first set of parameters comprises:

the first address of the signature; and the second address of a signature algorithm.

17. The method of claim 13, further comprising:

embedding a second key in a boot file based on an address; and exporting the boot file for use by the first vehicle control module, wherein the first set of parameters comprises the address of the second key, and wherein the boot file includes instructions that when executed by the first vehicle control module verify the signature based on the second key.

18. The method of claim 13, further comprising determining whether the first content file is one of a calibration file, a software file, a firmware file, a boot file, a key replacement file, and a license file.

19. The method of claim 13, further comprising:

generating the second instruction file based on a creator identifier and a certificate; and generating the second content file based on the certificate, wherein the first set of parameters comprises the creator identifier indicating a person that created the first content file, the certificate indicating a second key to use to validate the signature and a plurality of vehicle control modules to use the second content file, and the plurality of vehicle control modules include the first vehicle control module.

20. The method of claim 13, wherein:

the second set of parameters comprises a job identifier indicating a number of a job request including the first content file and the second set of parameters, a key identifier indicating a second key the signature server is to use to generate the signature, and a signature algorithm identifier indicating a signature algorithm the signature server is to use to generate the signature;

the signature file comprises a third set of parameters; and the third set of parameters comprises the job identifier indicating the number of the job request including the first content file and the second set of parameters, and the signature.

* * * * *